United States Patent Office 2,904,805
Patented Sept. 22, 1959

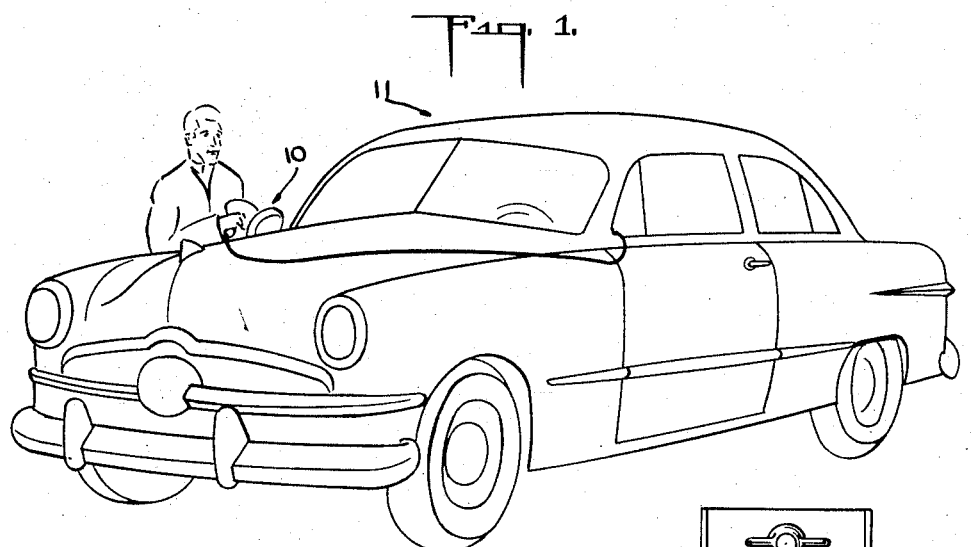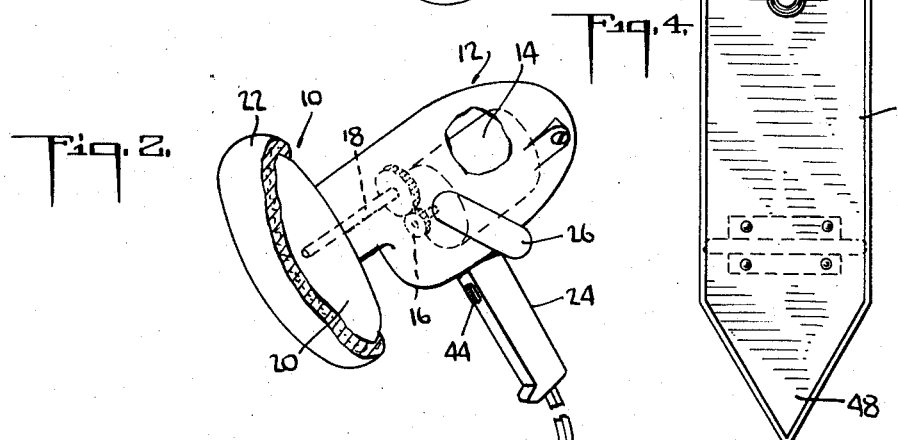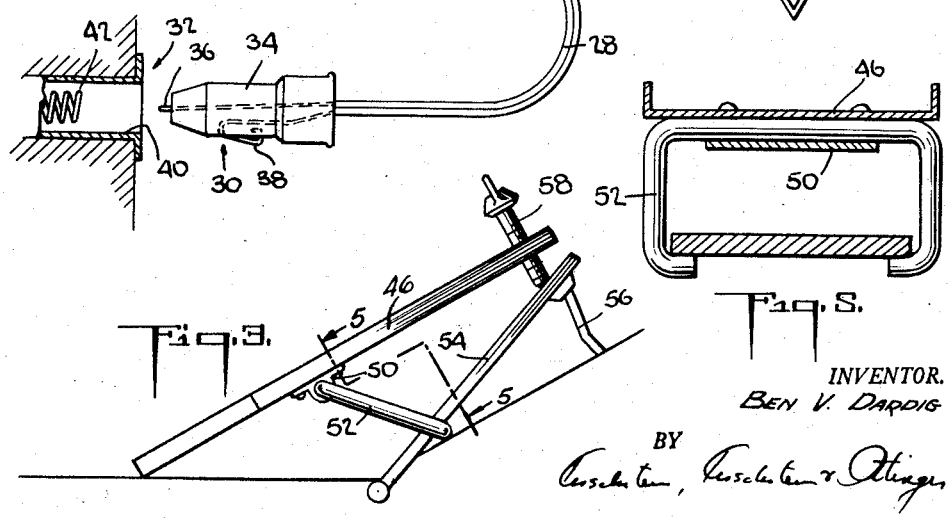

2,904,805

AUTOMOBILE BUFFER

Ben V. Dardig, New York, N.Y.

Application October 2, 1956, Serial No. 613,486

6 Claims. (Cl. 15—97)

This invention relates to automobile buffers, and, more particularly, is concerned with an electric automobile buffer which does not rely for energy upon the local power company and, hence, is not topographically limited to use in the vicinity of a conventional 110 volt outlet.

A high, tough gloss on the wax finish of an automobile is particularly difficult to secure. To acquire it entails passing a buffing surface repeatedly over a hard wax film under the correct conditions of pressure and speed to flow the wax into a very thin transparent continuous layer. Many manufacturers, recognizing that the average automobile owner does not have the time, tenacity or inclination properly to manually manipulate the buffing surface, have compounded a variety of waxing liquids and pastes which purport to provide a hard, shiny wax finish without intensive buffing. However, it is an accepted fact that it is not possible to secure a truly durable, wear-resistant, lustrous finish except by buffing so that even today car owners regularly have their automobiles professionally machine-buffed. The average car owner is unable to use an automobile buffer himself because in most instances he cannot find a shaded spot conveniently located with respect to a 110 volt power outlet, and he does not have a long extension cord. Accordingly, even if he wants to, he cannot buff or clean his own car.

It is the principal object of my invention to provide an automobile buffer which will overcome the foregoing drawbacks.

It is another object of my invention to provide an automobile buffer which can be used wherever the car may be and is not topographically restricted to usage near a local 110 volt power outlet.

It is another object of my invention to provide an automobile buffer which draws its power from the car itself so that it can be employed by the driver any time he has a spare moment, either to put on an initial hard, shiny wax finish, or to brush up a dirty or worn area of an existing finish.

It is another object of my invention to provide buffing equipment of the character described which can be arranged to operate without undue drain on the battery of a car.

It is another object of my invention to provide an automobile buffer of the character described which constitutes relatively few and simple parts, and is easy to use, inexpensive to manufacture, and, withal, rugged, long-lasting and fool-proof.

Other objects of my invention in part will be obvious and in part will be pointed out hereafter.

My invention accordingly consists in the features of construction, combinations of elements and arrangements of parts which will be exemplified in the device hereinafter described and of which the scope of application will be indicated in the appended claims.

In the accompanying drawings, in which is shown one of the various possible embodiments of my invention, Fig. 1 is a perspective view of an automobile being waxed with a buffer constructed in accordance with the present invention;

Fig. 2 is a perspective partly broken away view of the buffer, buffer plug and automobile power socket;

Fig. 3 is a side view of a part of the buffer apparatus employed to regulate the power supplied from the automobile;

Fig. 4 is an auxiliary view of said part of the apparatus, the same being taken parallel to the hold-down plate; and Fig. 5 is an enlarged sectional view taken substantially along the line 5—5 of Fig. 3.

Referring now in detail to the drawings, the reference numeral 10 denotes an automobile buffer embodying my invention. Said buffer is light, compact and fully portable so that it can be used by a car owner to wax his automobile 11 wherever the same may be located, and despite the fact that there is no convenient 110 volt outlet from which power can be drawn. Said buffer includes a metal casing 12 within which there is contained a six-volt D.C. motor 14. It may be mentioned that, if desired, said motor may be a twelve-volt D.C. motor for use with a twelve-volt automobile electric system. The speed of the motor is reduced by a train of gears 16 so that the output shaft 18 of the buffer turns over at a suitable low speed, e.g. 1400 r.p.m., for buffing. The speed reduction train also serves to provide the high torque that is desirable for buffing. The motor shaft has secured thereto a rubber disc 20 which carries the usual buffing bonnet 22.

Suitable manipulation means such, for instance, as a downwardly extending grip 24 and a laterally extending handle 26, are secured to the casing.

A two-wire electric power supply cord 28 runs from the motor terminals through the grip 24 to a conventional male plug 30. Said plug is designed to couple with a standard electrical female outlet 32 of the electrical system of an automobile, this being the outlet usually located on the dashboard and in which it is customary to locate a cigarette lighter.

The plug 30 constitutes a tubular housing 34 composed of electrically non-conductive material such as a synthetic thermosetting plastic. Carried by the plug is a central contact 36 which protrudes from the tip of the housing and a side contact 38 which projects laterally from the housing. The two contacts are made of electrically conductive material and are suitably connected inside the plug to the two wires of the duplex cord 28. The laterally extending contact 28 is formed of resilient wire and lies over a groove in the side of the housing so that it can be flexed toward the housing when it engages the socket 32. The central contact 36 is spring mounted to permit a slight axially yielding movement when engaging the socket.

The socket 32 includes a cupped metal shell 40 the side walls of which are designed to be engaged by the lateral contact 38 and a base-carried central spring contact 42 designed to be engaged by the tip contact 36, said central contact being insulated from the shell. The shell and spring 40 and 42 are connected in the normal manner to the two terminals of the automobile battery, the shell 40 being grounded and the spring 42 being connected to the positive terminal. The housing 34 is of such diameter that it will slide easily into the shell 40, being, however, frictionally retained therein by the drag between the contact 38 and the interior side surface of the shell.

If desired a switch 44 conveniently located on the buffer, as for example, on the grip 24, is provided to turn the buffer off or on when the plug is coupled with the socket.

Inasmuch as during operation the buffer is pressed with considerable force against a car and, therefore, requires a substantial amount of power, it draws appreciable load and would seriously drain the car battery if the automobile were standing idle. To avoid this, as a feature of my invention, I provide suitable means for adjustably idling the automobile off the electrical system of which the buffer is operating, at a speed proper to offset the drain of the buffer. Said means, as shown herein, comprises a flat hold-down plate 46 of any suitable configuration whose lower end 48 preferably is tapered to enable it to bear against a small space on the floorboard of the car and thus be adaptable for use in a variety of cars by readily avoiding the protuberances that often are haphazardously located on the floors of cars adjacent the bottom of the accelerator pedal. Rotatably secured to the plate 46 as, for example, by means of a saddle bearing 50 carried on the undersurface of the hold-down plate, is a C-ring 52. The shank of the ring is journalled in the bearing 50 and the tips of the open-side of the ring are spaced apart a distance less than the width of the narrowest accelerator pedal 54 on an American car. Conventionally, automobile gas pedals are oblong in shape. The C-ring is designed to slidably engage such a pedal by slipping down from the top thereof. The top and bottom of the C-ring are spaced apart a distance greater than the width of the widest of gas pedals and tips of the ring are spaced apart a distance less than the narrowest of gas pedals, thus enabling the ring to engage any standard pedal by slipping over the pedal regardless of any linkage system such as that indicated at 56 which connects the pedal to the accelerator control of the motor and is located at the undersurface of the pedal. The hold-down plate also carries a thumb bolt 58 which is screwed through a tapped opening in the plate and has its tip engaging the upper end of the accelerator pedal.

To employ the hold-down plate, the C-ring is slipped over the accelerator pedal and the tapered lower end thereof is placed in any convenient spot on the floorboard of the car. Then the thumb bolt is screwed in until its tip presses lightly against the accelerator pedal. In operation of the device the friction between the C-ring and the accelerator and between the lower end of the hold-down plate and the floorboard will retain the hold-down plate in any position in which it has been set. The automobile motor is started and the buffer turned on. The thumb bolt now is tightened and the idling speed of the motor thereby increased until the ammeter needle indicates that the motor is turning over at a high enough speed to balance the drain of the buffer, that is to say at such time the ammeter needle is at or near zero. The buffer now can be used for as long as desired without discharging the battery.

It thus will be seen that I have provided a device which achieves the several objects of my invention and is well adapted to meet the conditions of practical use.

As various possible embodiments might be made of the above invention, and as various changes might be made in the embodiment above set forth, it is to be understood that all matter herein described, or shown in the accompanying drawings, is to be interpreted as illustrative and not in a limiting sense.

Having thus described my invention I claim as new and desire to secure by Letters Patent:

1. In combination with an automobile buffer having a buffing shaft, a buffing disc, a low voltage heavy duty D.C. motor with a speed reduction train for rotating the buffing shaft, an electrical cord connected to the D.C. motor, and a plug connected to the free end of the cord and adapted to be detachably coupled to the D.C. electrical system of an automobile for energizing the motor from said system; an adjustable hold-down means adapted to be detachably secured directly to an automobile accelerator pedal for selectively setting the idling speed of the automobile motor so as to offset the drain of the buffer motor.

2. In combination with an automobile buffer having a buffing shaft, a buffing disc, a low voltage heavy duty D.C. motor with a speed reduction train for rotating the buffing shaft, an electrical cord connected to the D.C. motor, and a plug connected to the free end of the cord and adapted to be detachably coupled to the D.C. electrical system of an automobile for energizing the motor from said system; an adjustable hold-down means adapted to be detachably secured directly to an automobile accelerator pedal and including a screw for selectively setting the idling speed of the automobile motor so as to offset the drain of the buffer motor.

3. In combination with an automobile buffer having a buffing shaft, a buffing disc, a low voltage heavy duty D.C. motor with a speed reduction train for rotating the buffing shaft, an electrical cord connected to the D.C. motor, and a plug connected to the free end of the cord and adapted to be detachably coupled to the D.C. electrical system of an automobile for energizing the motor from said system; an adjustable hold-down means adapted to be detachably secured directly to an automobile accelerator pedal for selectively setting the idling speed of the automobile motor so as to offset the drain of the buffer motor, said hold-down means including an elongated member, means detachably securing an intermediate part of said member to an intermediate part of said pedal, an end of the member touching the floorboard of the automobile and means adjustably securing the other end of said member to the accelerator pedal.

4. In combination with an automobile buffer having a buffing shaft, a buffing disc, a low voltage heavy duty D.C. motor with a speed reduction train for rotating the buffing shaft, an electrical cord connected to the D.C. motor, and a plug connected to the free end of the cord and adapted to be detachably coupled to the D.C. electrical system of an automobile for energizing the motor from said system; an adjustable hold-down means adapted to be detachably secured directly to an automobile accelerator pedal for selectively setting the idling speed of the automobile motor so as to offset the drain of the buffer motor, said hold-down means including a hold-down plate, a bail rotatably secured to the plate intermediate its ends and adapted to engage the pedal, one end of said plate being adapted to rest on the floorboard of the automobile and a screw extending through the other end of the plate and adapted to adjustably press against the accelerator pedal.

5. In combination with an automobile buffer having a buffing shaft, a buffing disc, a low voltage heavy duty D.C. motor with a speed reduction train for rotating the buffing shaft, an electrical cord connected to the D.C. motor, and a plug connected to the free end of the cord and adapted to be detachably coupled to the D.C. electrical system of an automobile for energizing the motor from said system; an adjustable hold-down means adapted to be detachably secured directly to an automobile accelerator pedal for selectively setting the idling speed of the automobile motor so as to offset the drain of the buffer motor, said hold-down means including a hold-down plate, a C-ring rotatably secured to the plate intermediate its ends and adapted to engage the pedal, one end of said plate being adapted to rest on the floorboard of the automobile and a screw extending through the other end of the plate and adapted to adjustably press against the accelerator pedal.

6. In combination with an electrical device which requires a substantial amount of power to operate and which is adapted to be disengageably connected to and run off of the electrical D.C. system of an automobile; an adjustable hold-down means adapted to be detachably secured directly to an automobile accelerator pedal for selectively setting the idling speed of the automobile motor so as to offset the drain of the device.

References Cited in the file of this patent

UNITED STATES PATENTS

| | | |
|---|---|---|
| 1,445,930 | Barringer | Feb. 20, 1923 |
| 1,631,500 | Newmark | June 7, 1927 |
| 1,667,579 | Zweig | Apr. 24, 1928 |
| 1,691,988 | Olson | Nov. 20, 1928 |
| 1,954,977 | Albertson | Apr. 17, 1934 |
| 2,157,472 | Bellis | May 9, 1939 |
| 2,541,218 | Doerr | Feb. 13, 1951 |
| 2,727,303 | Marley | Dec. 20, 1955 |